United States Patent
Thoma

[19]

[11] Patent Number: 6,138,028
[45] Date of Patent: Oct. 24, 2000

[54] METHOD AND RADIO STATION FOR THE TRANSMISSION OF DATA BY WAY OF A GSM MOBILE RADIO NETWORK

[75] Inventor: Sebastian Thoma, München, Germany

[73] Assignee: Siemens Aktiengesellschaft, Munich, Germany

[21] Appl. No.: 09/077,845

[22] PCT Filed: Dec. 2, 1996

[86] PCT No.: PCT/DE96/02312

§ 371 Date: Jun. 16, 1998

§ 102(e) Date: Jun. 16, 1998

[87] PCT Pub. No.: WO97/24891

PCT Pub. Date: Jul. 10, 1997

[30] Foreign Application Priority Data

Dec. 28, 1995 [DE] Germany ............... 195 49 009

[51] Int. Cl.$^7$ ............... H04Q 7/20; H04B 7/00; H04J 3/12
[52] U.S. Cl. ............... 455/466; 455/517; 370/522
[58] Field of Search ............... 370/328, 338, 370/337, 349, 407, 522, 329–336; 379/93.02, 93.03; 455/403, 452, 560, 422, 435, 428

[56] References Cited

U.S. PATENT DOCUMENTS

| | | | |
|---|---|---|---|
| 4,821,310 | 4/1989 | Lynk, Jr. et al. ............... | 455/517 |
| 4,887,265 | 12/1989 | Felix ............... | 370/333 |
| 5,502,721 | 3/1996 | Pohjakallio ............... | 370/336 |
| 5,502,725 | 3/1996 | Pohjakallio ............... | 370/337 |
| 5,729,541 | 3/1998 | Hamalainen et al. ............... | 370/337 |
| 5,802,465 | 9/1998 | Hamalainen et al. ............... | 455/403 |
| 5,862,478 | 1/1999 | Cutler, Jr. et al. ............... | 455/428 |
| 5,896,376 | 4/1999 | Alperovich et al. ............... | 370/348 |
| 5,905,950 | 5/1999 | Anell ............... | 455/421 |
| 5,987,319 | 11/1999 | Hermansson et al. ............... | 455/422 |
| 6,072,787 | 6/2000 | Hamalainen et al. ............... | 370/335 |

FOREIGN PATENT DOCUMENTS

| | | |
|---|---|---|
| 0 332 818 A2 | 9/1989 | European Pat. Off. . |
| 0 642 283 A2 | 8/1995 | European Pat. Off. . |
| 44 02 903 A1 | 3/1995 | Germany . |

OTHER PUBLICATIONS

IEEE International Symposium on Personal, Indoor and Mobile Radio Communications, vol. 1, Sep. 27, 1995, J. Haemaelaeinen et al, "Proposed Operation of GSM Packet Radio Networks", pp. 372–377.

"Das zukünftige paneuropäische digitale Mobilfunksystem" (The future pan–European digital mobile radio system), Partd 1 to 3, H. Ochsner, Bulletin SEV/VSE (ASE/UCS), 79 (1988), dated Jun. 4, Aug. 6 and Nov. 5, pp. 603–608; 937–942; & 1318–1324.

Primary Examiner—Nguyen Vo
Assistant Examiner—Charles N. Appiah
Attorney, Agent, or Firm—Hill & Simpson

[57] ABSTRACT

Method and radio station for transmitting information via a GSM mobile radio network. When information, in particular packetized data, is being transmitted via a GSM mobile radio network, the context definition for the radio interface between the mobile station and the base station takes place at a different time from the setting up of the physical traffic relationships, and thus uses the radio resources for this physical traffic relationship more efficiently.

19 Claims, 4 Drawing Sheets

Fig.2
a)
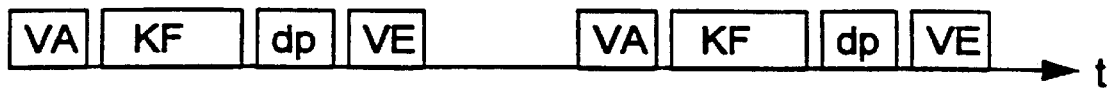
b)
c)
d)
e)
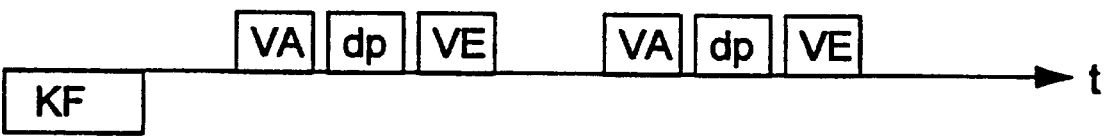
f)
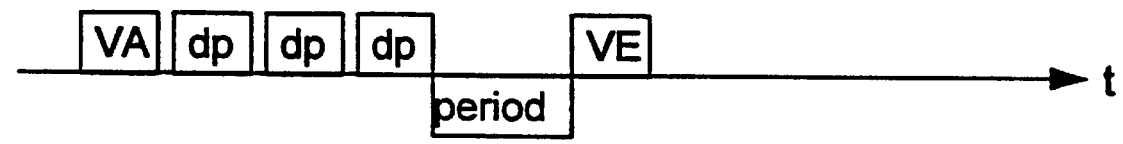

METHOD AND RADIO STATION FOR THE TRANSMISSION OF DATA BY WAY OF A GSM MOBILE RADIO NETWORK

BACKGROUND OF THE INVENTION

The invention relates to a method and radio station for transmitting information via a GSM mobile radio network, in which a context is defined for a traffic relationship between a mobile station and a further communications terminal via a radio interface between the mobile station and a base station.

GSM mobile radio networks were developed in order to transmit voice information to mobile communications terminals as well. The GSM mobile radio network is known, for example, from the document "Das zukünftige paneuropäische digitale Mobilfunksystem" (The future pan-European digital mobile radio system), Parts 1 to 3, H. Ochsner, Bulletin SEV/VSE (ASE/UCS), 79 (1988), dated June 4, August 6 and November 5. The mobility of communications terminals is achieved by the fact that information is transmitted via a radio interface between a mobile station (which represents one communications terminal which is involved in the traffic relationship) and a base station (which provides the network access). In the radio area of a base station, the mobile stations can be accessed all the time. Furthermore, it is known for traffic relationships to be transferred between the radio areas of different base stations. These GSM mobile radio networks can be designed as global networks, covering large areas. A context must be defined for the radio interface between the mobile station and the base station for each traffic relationship. This context comprises, for example, details about the coding to be selected, the scrambling, the encryption, the authenticity of the mobile station and of the further communications terminal as well as to the service to be selected and any other parameters.

The context definition for a traffic relationship in this case takes place while the link for this traffic relationship is being set up. It must therefore be carried out once again for each traffic relationship. For voice transmission, the time duration for context definition for each traffic relationship is not critical within the context of setting up this traffic relationship since the time consumed for context definition is short in comparison with the time duration of the voice information transmission. The use of radio resources from the radio interface for context definition is thus no longer relevant for voice links.

It is furthermore known from European Patent Specification EP 0 332 818 A2 for a mobile radio network to be adapted for data transmission. To do this, the mobile stations must be suitable for data acquisition, storage and transmission, and the mobile radio system must be able, after appropriate signaling, to carry both traffic relationships for voice information and traffic relationships for data transmission. In this case, data transmission is packet-oriented, that is to say there is no quasi-continuous information flow as in the case of voice transmission, and individual data packets are transmitted only sporadically. The relationship between the radio resources provided in the radio interface and the radio resources actually used for transmitting packetized data is unfavorable; this type of mobile radio system configuration does not allow the radio resources to be used economically.

With regard to connection control, it is possible to set up an autonomous traffic relationship for each data packet or each group of data packets, and to clear this traffic relationship down again once these packetized data have been transmitted. In consequence, radio resources are not used during the pause times and can be used for further traffic relationships. However, in this case, it has been found that the time duration for definition of the context of the traffic relationship becomes more significant in comparison with the time duration for information transmission. This means that the context definition uses a large proportion of the radio resources in comparison to that for data transmission.

It is furthermore generally known from telecommunications technology for a logic traffic relationship to be set up when a request for a traffic relationship is present, which logic traffic relationship does not continuously involve the switching resources and produces a physical traffic relationship only briefly, during the actual transmission of the wanted information. At least part of the definition of the traffic relationship context in this case takes place while the logic traffic relationship is being set up. However, there is a fixed time relationship between the definition of the context of the traffic relationship after a connection request and the setting up of this traffic relationship, and this leads to a time delay between the request for this traffic relationship and the start of the first information transmission. In this case, at the time of the request for the traffic relationship, there may also be a shortage of radio resources for the radio interface, as a result of which the setting up of the traffic relationship is further delayed, or even becomes impossible.

From EP 0 642 283 A1 it is known for a virtual channel to be set up before the transmission of packet data in a physical channel of a mobile radio network, so that the subsequent setting up of the physical channel is speeded up.

SUMMARY OF THE INVENTION

The invention is based on the object of using more efficiently the radio resources for the transmission of information via a radio interface between mobile stations and base stations in GSM mobile radio networks.

The radio resources are used more efficiently as a result of the fact that the setting up of the traffic relationship is speeded up since the context of this traffic relationship is already defined in advance, independently of the time when the physical traffic relationship is next set up. The decoupling of the context definition and the setting up of the physical traffic relationship makes it possible to request the radio resources when they are sufficiently available or when other traffic relationships already exist via which the context definition can be handled quickly. The context of the traffic relationship in this case advantageously comprises at least one of the following details relating to authenticity, encryption, coding and/or service definition. Depending on the requirement, this makes it possible to carry out the definition of at least parts of the context of the traffic relationship even before the physical traffic relationship is set up.

Depending on the service, and possibly, before this service is selected by the mobile station or the further communications terminal, it is thus possible at least partially to dispense with complex signaling messages in the process of setting up the traffic relationship. The method according to the invention has been found to be particularly advantageous if the information to be transmitted represent packetized data. The radio resources can thus be used particularly efficiently and economically in the case of packet-oriented data transmission.

The context definition with respect to the coding defines, for example, the channel coding between the base station and the mobile station. For example, the base station offers, via a broadcast channel (the BCCH in the GMS mobile radio system), those possible channel codings among which the mobile station can make a choice. In the context of a data rate to be chosen, this limits the possible services, and the appropriate resource assignment on the network side is carried out by allocating one or more channels with the selected channel coding. The independent context definition according to the invention allows the information transmission to be continuously matched to the individual requirements.

If a number of services have been licensed for the mobile station, prioritization within the services can also be carried out within the context definition. On the basis of these priorities, and possibly prioritization within the mobile stations, an appropriate choice can be made if a number of services are present at the same time.

The possible services include fax messages, Internet mail or file transfer. The general access to these services is stored on a subscriber-specific basis in the network (for example in the home location register HLR of the GSM mobile radio network, a special register for a data transmission network or in the mobile station). These entries may be changed by the network operator. In this case as well, the independent context definition provides wide freedom of action both for the network operator (who can define the possible services) and for the mobile station, that is to say the subscriber, who can make an appropriate choice within the services.

The context of the traffic relationship for the radio interface can in this case be defined by a separate signaling message interchange between the mobile station and the further communications terminal or base station or, alternatively, this traffic relationship context is permanently predetermined by other means. This results in a further degree of freedom for the reduction in the use of radio resources but, however, dispensing with greater flexibility in the context definition for each traffic relationship. However, many traffic relationships between communications partners allow once-off definition or at least greatly constricted flexibility of the traffic relationship context. This is the case, for example, for applications such as point of sales, remote controlled telemetry and other applications in which a traffic relationship context always contains a small number of identical parameters which can be predetermined.

In order to allow the setting up of the traffic relationship to be speeded up, an individual channel is advantageously assigned by the base station immediately after a traffic relationship request message. Such an individual channel may be a fast associated control channel (FACCH) or a wanted data channel (TCH).

The context of the traffic relationship advantageously provides the following permanently stored entries for the mobile station: a packet data address in addition to the GSM address itself, an address for the gateway to a data network (for example the gateway to the Internet), a profile relating to the nature of the subscribers with whom a traffic relationship can be set up (for example, no outgoing foreign calls), and an address of a radio area for calling the mobile station, which address is independent of the GSM telephone address itself (routing area).

The definition of the traffic relationship context may form the basis, for example, of a logic traffic relationship which is set up independently of the time of transmission of the packetized data and, possibly, independently of a traffic relationship request. Physical traffic relationships are then set up only at times within the logic traffic relationship (connected via the radio interface), these physical traffic relationships being those which use the radio resources for packet data transmission. However, as an alternative, it is possible during a preceding physical traffic relationship for data transmission to define the context at least partially for the next physical traffic relationship. This can facilitate adaptation to changing conditions in the traffic relationship or else make it harder to listen in to the traffic relationship without authorization.

The method according to the invention is particularly advantageous if, in the case of the physical connection of a traffic relationship within a logic traffic relationship, no further context definition takes place before the provision of an individual channel. The entire traffic relationship context is thus determined within the logic traffic relationship so that, in the case of the physical connection of the traffic relationship, that is to say in the case of a physical traffic relationship, only the traffic relationship request and channel assignment need occur. The definition of the context of the traffic relationship can likewise be carried out from one logic traffic relationship to the next logic traffic relationship. Depending on the desired service, this results in a wide range of configuration options, and this allows effective utilization of the radio resources in the radio interface.

The radio resources are also used more efficiently as a result of the fact that they are not unnecessarily blocked. At times, the use of radio resources within a physical traffic relationship is unpredictable, and it is therefore advantageous to reset and to activate a presettable time switch after transmitting a data packet so that, once this time switch is timed out, the physical traffic relationship is automatically cleared down, that is to say the context of the traffic relationship is reset.

If, for example, no packet data are transmitted for 5 seconds, then a physical traffic relationship is cleared down again by logging off from the radio resources. A logic traffic relationship can likewise be cleared down in the same way. These measures reduce the amount of blocking of resources and the signaling complexity to maintain a logic traffic relationship. The time switch or time switches is or are advantageously set at the network end, in which case it is necessary to provide a time switch both at the network and in the mobile station. By appropriately setting the time switches, it is possible to cause a mobile station to give up a physical traffic relationship or to cease packet data transmission completely, and thus also to give up the logic traffic relationship.

Depending on the current transmission conditions or in order to reorganize the resources, the context can be changed by changing the prioritization or the number of channels while a logic traffic relationship is in existence. The priorities and the data rate are advantageously variable from one physical traffic relationship to the next physical traffic relationship since this results in improved utilization of the radio resources, depending on the number of mobile stations to be supplied and depending on the transmission conditions. In particular, prioritization between data and voice can be carried out when mixed types of mobile stations are in use which are configured for data services and voice services.

In order likewise to decouple the determination of the timing advance from the setting up of the physical traffic relationship, this is determined at periodic intervals and is stored in the mobile station. Once again, this allows the setting up of a physical traffic relationship to be speeded up and the use of radio resources to be shifted to time intervals where the loads on the radio interface are, in some circumstances, reduced.

The traffic relationship context may be defined both between mobile station and base station as well as between mobile station and a further communications terminal. The traffic relationship context can in this case provide prioritization for the assignment of radio resources of the radio interface for the next information transmission. In consequence, it is possible, for example, to give priority to the transmission of packet data over voice data.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2a–2f show a number of options for the definition of the traffic relationship context with respect to the transmission of packetized data.

DESCRIPTION OF THE PREFERRED EMBODIMENTS

Figure 1:
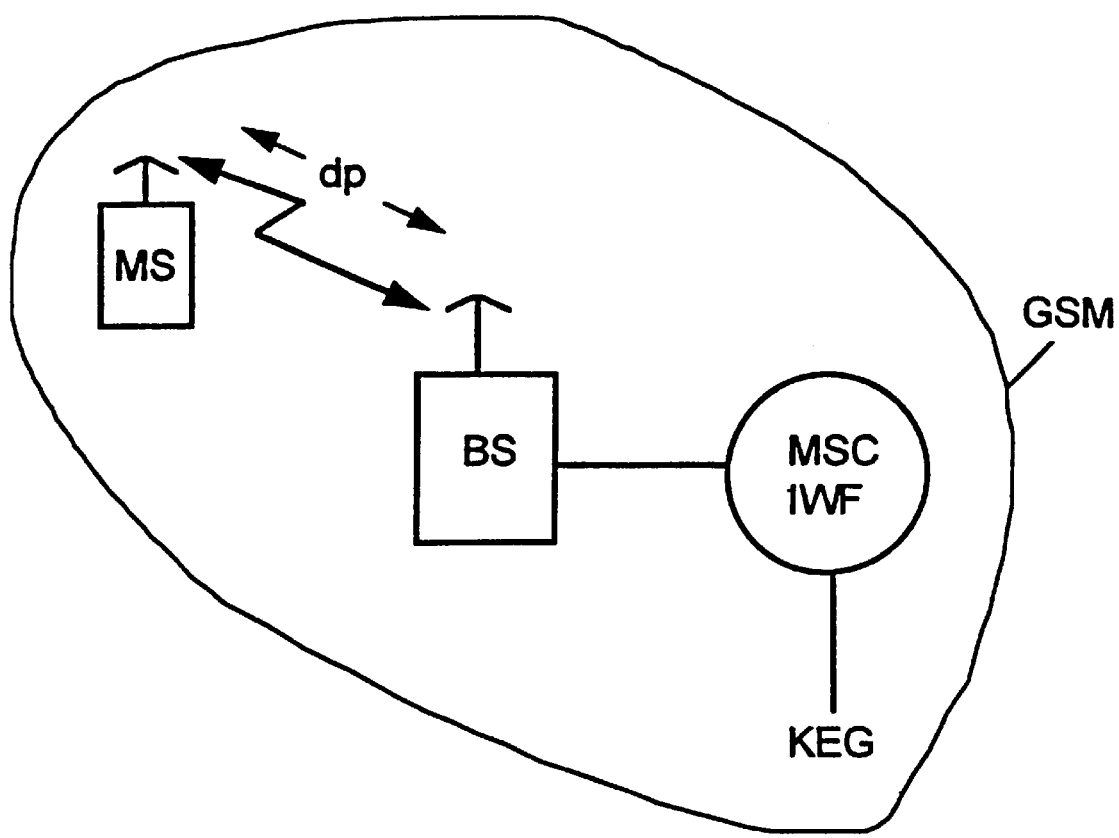
FIG. 1 shows a schematic illustration of a GSM mobile radio network.

A GSM mobile radio network GSM contains, for example, a base station BS in whose radio area a mobile station MS, by way of example, is located. Information can be transmitted via a radio interface between the base station BS and the mobile station MS. The base station BS produces the link to further devices in the GSM mobile radio network GSM. These further devices are, for example, a mobile station controller MSC and a unit for providing interworking functions. In this case, the GSM mobile radio network GSM may be connected to further communications networks. By way of example, a further communications terminal KEG can be connected to the GSM mobile radio network, or is itself a part of this GSM mobile radio network GSM.

The GSM mobile radio network GSM is intended to be used for transmission of packetized data dp in parallel with known voice transmission. In this case, the device for providing interworking functions IWF can couple the GSM mobile radio network GSM to data transmission networks, and thus to the further communications terminal KEG.

The radio resources of the radio interface are limited and, in addition, are subject to severe load-level fluctuations. This can lead to a situation in which it is impossible to set up a traffic relationship since no further radio resources are available for the moment of the request for the traffic relationship, or the setting up of the traffic relationship is delayed. Meanwhile, at other times, the load level on the radio resources is considerably lower, so that the definition of the traffic relationship context which is not required immediately for setting up a traffic relationship can be carried out during these time intervals.

FIG. 2 shows various options for the definition of the traffic relationship context. In this case, FIG. 2a shows a known procedure, on the basis of which a physical traffic relationship is set up VA in a first signaling message interchange, at which point the context KF of the next information transmission is defined, with packetized data dp being interchanged during the information transmission, and the physical traffic relationship is cleared down in a traffic relationship clearing-down process VE. This process is repeated for each traffic relationship. In accordance with the definitions of the GSM mobile radio system, which operates on the basis of a combined time-division multiplexing method and frequency-division multiplexing method, the sequences illustrated in FIGS. 2a–2f are distributed between discrete time slots and do not represent a continuous sequence.

In FIG. 2b, a logic traffic relationship is first of all set up VAL according to the invention, at which point the traffic relationship context is defined KF. This setting up of a logic traffic relationship takes place completely independently of the time of the subsequent information transmission, at a time when the load level on the radio resources is low. The physical traffic relationships can then be produced at any desired times by a traffic relationship setting up process VA, the subsequent transmission of packetized data dp, and a clearing down process VE for this physical traffic relationship.

FIG. 2c illustrates the option of carrying out the context definition for the next physical traffic relationship before a physical traffic relationship is cleared down VE. In this case, an established traffic relationship can be used to interchange the information required for context definition, without any major additional signaling complexity. Thus, it is specifically possible for the base station BS to assign an individual channel immediately for the following physical traffic relationship. Thus, no further context definitions, or at least only greatly reduced context definitions, are necessary for this next physical traffic relationship.

FIG. 2d refers to FIG. 2b, that is to say a logic traffic relationship is once again set up VAL and packetized data dp are transmitted in subsequent physical traffic relationships, but a further context definition KF for the next following logic traffic relationship is carried out before the cancellation VEL of this logic traffic relationship. No further context definition, or only a limited context definition, would then be required for the next logic traffic relationship.

As is illustrated in FIG. 2e, it is also possible for the traffic relationship context to be permanently defined KF once, that is to say that it takes place without any signaling message interchange and is used, for example, when it is intended to set up a link between two defined communications terminals MS, KEG. It would thus be possible to carry out further physical traffic relationships between these two communications terminals MS, KEG without definition KF of the traffic relationship context, or with only parts of this definition.

FIG. 2f illustrates the situation in which a physical traffic relationship is cleared down VE automatically after it has been set up VA and the data packets dp have been transmitted and a period which is defined by a time switch which can be preset has passed since the last transmission of a data packet dp. Thus, radio resources are not used unnecessarily during relatively long transmission pauses, which are sometimes unpredictable.

Figure 3:
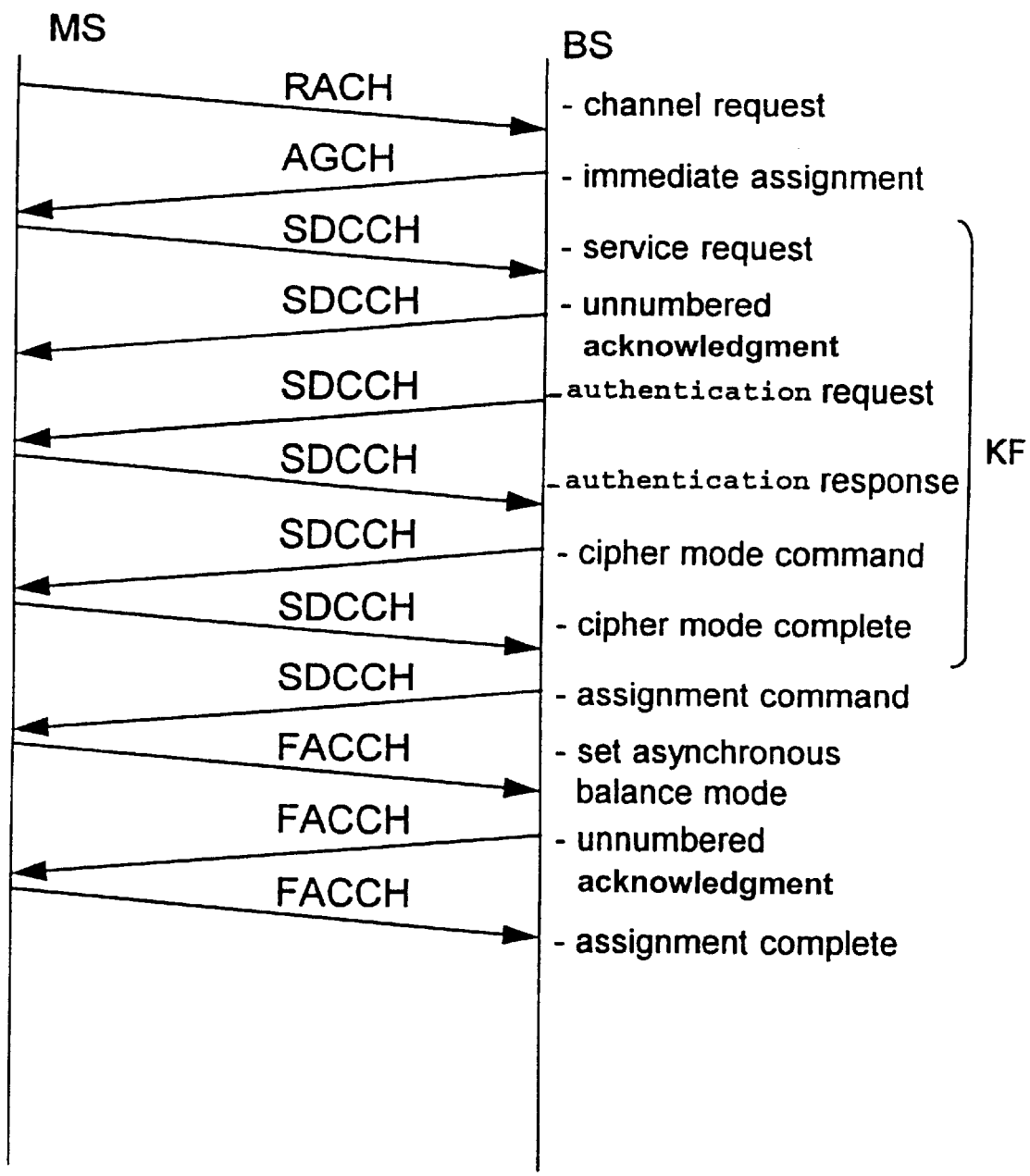
FIG. 3 shows the signaling message interchange for context definition and for setting up a physical traffic relationship according to the prior art.

FIG. 3 shows the signaling message interchange between a mobile station MS and a base station BS for setting up a traffic relationship after an appropriate request. On the basis of the prior art, the definition KF of the traffic relationship context takes place after this. In the GSM mobile radio network GSM, the base station BS assigns a channel (immediate assignment) on an access ground channel (AGCH) after a traffic relationship request message (channel request) by the mobile station MS on a random access channel (RACH). The mobile station MS then requests a service (service request) and, in the process, uses the assigned stand-alone dedicated control channel (SDCCH) to do this. This is confirmed by the base station BS (unnumbered acknowledgment).

The base station BS then requests an authentication check (authentication request), to which the mobile station MS responds appropriately (authentication response). The encryption definition is carried out in the same way by a request (cipher mode command) by the base station BS and a response (cipher mode complete) by the mobile station MS. However, further signaling messages may also occur during this context definition. The base station BS then assigns an individual channel (assignment command) to the traffic relationship via the radio interface. The protocol for the requested service within the traffic relationship is defined by a definition of the transmission mode (set asynchronous balanced mode (SABM)) by the mobile station MS and a further acknowledgment (unnumbered acknowledgment (UA)) by the base station BS. After completion of the traffic relationship context definition, the mobile station MS can use a signaling message (assignment complete) to report that the setting up of the traffic relationship has been completed.

Owing to the fact that, according to the GSM mobile radio system, a slow stand-alone dedicated control channel (SDCCH) is used for the definition of the traffic relationship context, and a fast associated control channel (FACCH) is used only for the service definition, the context definition takes a relatively long time. This context definition could, however, be carried out even before the traffic relationship in times when the load on the radio resources is low and on fast channels or within previous traffic relationships.

Figure 4:
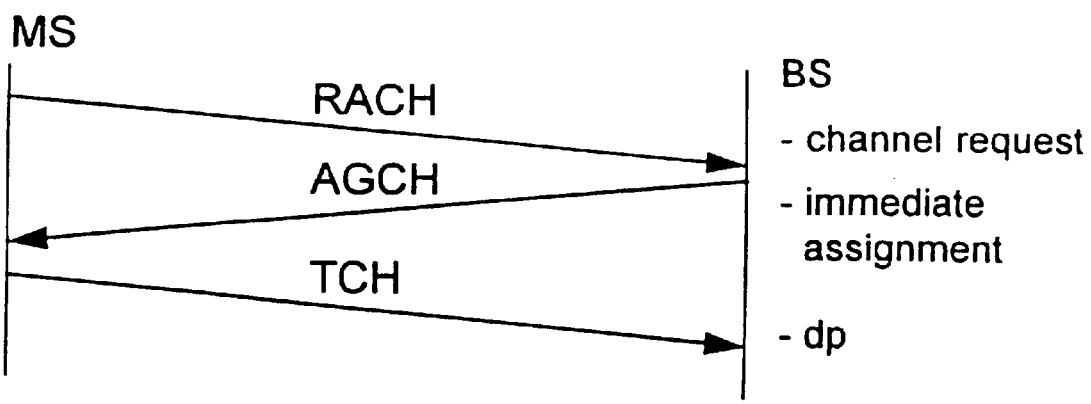
FIG. 4 shows speeded-up setting up of a traffic relationship.

According to FIG. 4, only one traffic relationship request message (channel request) would then be required by the mobile station MS, and one channel assignment (immediate assignment) by the base station BS in order to start transmitting packetized data dp immediately or, at least, to start service definition immediately.

Figure 5:
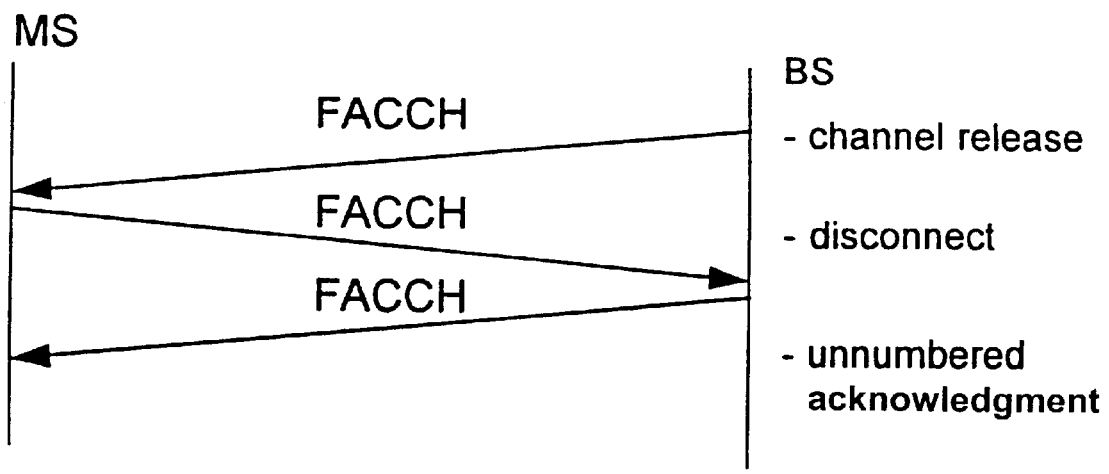
FIG. 5 shows the clearing down of a traffic relationship.

The clearing down of a traffic relationship without context definition for the next traffic relationship is carried out, for example, according to FIG. 5 by the base station BS transmitting a release message (channel release) on a fast associated control channel (FACCH) of the mobile station MS, at which point said mobile station MS transmits a release message (disconnect (DISC)) and the base station BS terminates the traffic relationship and signals this to the mobile station MS by means of an acknowledgment message (unnumbered acknowledgment (UA)).

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting information via a mobile radio network, the transmitted information representing packetized data, comprising the steps of:

defining a context, before setting up a traffic relationship between a mobile station and a further communications terminal via a radio interface between the mobile station and a base station;

defining, for speeding up the setting up of the traffic relationship, and during a previous physical traffic relationship, at least parts of said context between the mobile station and the base station before the traffic relationship is set up and before clearing down the previous physical traffic relationship.

2. The method as claimed in claim 1, wherein the parts of the traffic relationship context comprise at least one of statements relating to authenticity, encryption, coding and service definition.

3. The method as claimed in claim 1, wherein the context of the traffic relationship is defined by a signaling message interchange.

4. The method as claimed in claim 1, wherein an individual channel of the radio interface is assigned immediately after a traffic relationship request message.

5. The method as claimed in claim 4, wherein the individual channel is one of a fast associated control channel or a wanted data channel.

6. The method as claimed in claim 1, wherein a logic traffic relationship which defines the context of the traffic relationship is set up for data transmission between the mobile station and the base station, physical traffic relationships using radio resources being set up only at times within the logic traffic relationship.

7. The method as claimed in claim 1, wherein at least parts of the context definition remain stored after a clearing of a logic traffic relationship.

8. The method as claimed in claim 3, wherein, when a physical traffic relationship is set up again between the mobile station and the base station within a logic traffic relationship, no further context definition takes place before assignment of an individual channel of the radio interface.

9. The method as claimed in claim 8, wherein, in addition and before clearing down a logic traffic relationship between the mobile station and the base station, a context definition is carried out for a following logic traffic relationship between the mobile station and the further communications terminal.

10. The method as claimed in claim 1, wherein, after transmission of a data packet, a time switch, which can be preset, is reset and is activated, and wherein the physical traffic relationship is cleared down after a set time duration period has elapsed.

11. The method as claimed in claim 1, wherein for the traffic relationship between the mobile station and the base station is determined at periodic intervals and is stored in the mobile station independently of existing traffic relationships.

12. The method as claimed in claim 1, wherein the traffic relationship context is defined by a protocol between the mobile station and further communications terminal.

13. The method as claimed in claim 1, wherein the context of the traffic relationship provides a prioritized assignment of resources of the radio interface for a next information transmission in the traffic relationship.

14. The method as claimed in claim 6, wherein, when a physical traffic relationship is set up again between the mobile station and the base station within a logic traffic relationship, no further context definition takes place before assignment of an individual channel of the radio interface.

15. The method as claimed in claim 14, wherein, in addition and before clearing down a logic traffic relationship between the mobile station and the base station, a context definition is carried out for a following logic traffic relationship between the mobile station and the further communications terminal.

16. A radio station in a mobile radio network having mobile stations and base stations comprising:

a transmitting device for transmitting information within a traffic relationship via a radio interface between a mobile station and a base station;

a defining device for defining a context, such that, for speeding up a setting of the traffic relationship, during a previous physical traffic relationship, at least parts of said context between the mobile station and the base station are defined before the traffic relationship is set up and before clearing down the previous physical traffic relationship.

17. The radio station as claimed in claim 16, wherein the radio station is one of a mobile station and a base station and transmits packetized data.

18. The radio station as claimed in claim 17, wherein the radio station further comprises a controller for controlling the defining means such that an individual channel of the radio interface for the traffic relationship is assigned immediately after a traffic relationship request message.

19. The radio station as claimed in claim 14, wherein the radio station further comprises a controller for controlling the defining means such that the context of the traffic relationship is defined by prioritized assignment of resources of the radio interface for a next information transmission.

* * * * *